United States Patent
Tschambser et al.

(10) Patent No.: US 10,551,228 B2
(45) Date of Patent: Feb. 4, 2020

(54) METHOD FOR MANUFACTURING A MAGNETO-INDUCTIVE FLOW MEASURING DEVICE WITH PARTIALLY REDUCED CROSS SECTION

(71) Applicant: Endress + Hauser Flowtec AG, Reinach (CH)

(72) Inventors: Florent Tschambser, Hesingue (FR); Lars Dreher, Ballrechten-Dottingen (DE); Thomas Sulzer, Basel (CH)

(73) Assignee: ENDRESS + HAUSER FLOWTEX AG, Reinach (CH)

( * ) Notice: Subject to any disclaimer, the term of this patent is extended or adjusted under 35 U.S.C. 154(b) by 288 days.

(21) Appl. No.: 15/510,853

(22) PCT Filed: Aug. 19, 2015

(86) PCT No.: PCT/EP2015/069053
§ 371 (c)(1),
(2) Date: Mar. 13, 2017

(87) PCT Pub. No.: WO2016/041724
PCT Pub. Date: Mar. 24, 2016

(65) Prior Publication Data
US 2017/0261356 A1  Sep. 14, 2017

(30) Foreign Application Priority Data
Sep. 17, 2014 (DE) .......... 10 2014 113 408

(51) Int. Cl.
*G01F 1/58* (2006.01)
*G01F 15/14* (2006.01)
*G01F 15/18* (2006.01)

(52) U.S. Cl.
CPC ............ *G01F 1/58* (2013.01); *G01F 1/588* (2013.01); *G01F 15/14* (2013.01); *G01F 15/18* (2013.01)

(58) Field of Classification Search
CPC .................. G01F 1/58; G01F 1/588
See application file for complete search history.

(56) References Cited

U.S. PATENT DOCUMENTS 2,733,604 A   2/1956 Coulter
3,406,569 A   10/1968 Rohmann
(Continued)

FOREIGN PATENT DOCUMENTS

CN   101738229 A   6/2010
CN   101788312 A   7/2010
(Continued)

OTHER PUBLICATIONS

German Search Report, German PTO, Munich, dated May 27, 2015.
(Continued)

*Primary Examiner* — Livius R. Cazan
(74) *Attorney, Agent, or Firm* — Bacon & Thomas, PLLC

(57) ABSTRACT

A method for manufacturing an apparatus for measuring flow of a fluid flowing through a measuring tube of metal using the magneto-inductive principle, comprising the method steps as follows: securing first and second collars of metal externally on the measuring tube with an orientation perpendicular to the tube axis of the measuring tube; lining the measuring tube internally with an electrically non-conductive, elastic liner; and altering a measuring section of the measuring tube located at least partially between the first collar and the second collar by means of cold deformation in such a manner that the cross sectional area of the measuring section is reduced compared with the cross sectional area of an inflow section of the measuring tube located upstream
(Continued)

from the measuring section and an outflow section of the measuring tube located downstream from the measuring section.

17 Claims, 3 Drawing Sheets

(56) References Cited

U.S. PATENT DOCUMENTS

| | | | | |
|---|---|---|---|---|
| 9,091,574 | B2* | 7/2015 | Neven | G01F 1/584 |
| 9,829,359 | B2* | 11/2017 | Neven | G01F 1/588 |
| 2005/0000300 | A1 | 1/2005 | Zingg | |
| 2010/0126282 | A1* | 5/2010 | Neuburger | G01F 1/588 |
| | | | | 73/861.12 |
| 2010/0132479 | A1 | 6/2010 | Van Willigen | |

FOREIGN PATENT DOCUMENTS

| | | |
|---|---|---|
| CN | 102818598 A | 12/2012 |
| CN | 102840357 A | 12/2012 |
| CN | 103124558 A | 5/2013 |
| DE | 10 2006 054 008 A1 | 5/2008 |
| DE | 10 2008 057 755 A1 | 5/2010 |
| DE | 10 2008 054 961 A1 | 7/2010 |
| DE | 10 2014 113 408 A1 | 3/2016 |
| EP | 2 600 119 A1 | 6/2013 |
| JP | H04-295722 A | 10/1992 |
| WO | 2010/069867 A1 | 6/2010 |

OTHER PUBLICATIONS

International Search Report, EPO, The Netherlands, dated Nov. 9, 2015.
Chinese Office Action in corresponding Chinese Application No. CN201580049314.3, dated Oct. 26, 2018.

* cited by examiner

METHOD FOR MANUFACTURING A MAGNETO-INDUCTIVE FLOW MEASURING DEVICE WITH PARTIALLY REDUCED CROSS SECTION

TECHNICAL FIELD

The invention relates to a method for manufacturing an apparatus for measuring flow of a fluid flowing through a measuring tube using the magneto-inductive measuring principle.

BACKGROUND DISCUSSION

Magneto-inductive flow measuring devices are widely applied in process and automation technology for fluids having an electrical conductivity of at least, for instance, 5 µS/cm. Corresponding flow measuring devices are sold by the applicant in the most varied of forms of embodiment for different areas of application, for example, under the mark, PROMAG.

The measuring principle rests on Faraday's law of magnetic induction and is known from multiple publications. By means of a magnet system secured on a measuring section, a constant magnetic field is produced directed essentially perpendicularly to the flow direction of the conductive fluid. In this way, ions present in the flowing fluid are deflected in opposite directions. The electrical voltage occurring from this charge separation is sensed by means of at least one measuring electrode pair likewise secured in the measuring tube subsection. The sensed voltage is proportional to the flow velocity of the fluid and therewith proportional to its volume flow rate.

The accuracy of a measurement of a magneto-inductive flow measuring device depends, in such case, on many different factors. Some thereof concern the construction per se, such as, for example, the positioning accuracy of the magnet system, or the read out of the measurement signal via the at least one measuring electrode pair as well as the geometry of the electrode pair. Furthermore, the measuring performance and accuracy of measurement have a sensitive dependence on the reigning flow profile of the fluid.

The flow profile, in turn, depends on the Reynolds number, which depends on the flow velocity, the geometry of the measuring tube and its interior surface roughness, on physical and/or chemical material parameters of the fluid, such as, for example, the viscosity, and on the inlet conditions of the fluid flowing in the measuring tube before the measuring section, in the so-called inlet section.

In the case of given flow quantity, or in the case of given volume flow rate, the flow velocity of the fluid is determined by the cross sectional area of the measuring tube. For very low flow velocities, in the case of a sufficiently long, straight, inlet section of the measuring tube adjoining the measuring section, typically a laminar flow profile is present. If the flow velocity, or the Reynolds number, increases, a transitional region is reached, in which the flow is influenced by the smallest disturbances. In this region, a comparatively high measured value deviation is observed. If the flow velocity increases further, then an increasingly turbulent flow profile is present, where the measured value deviation is again comparable with that in the case of a laminar flow profile. Very high flow velocities can, however, disadvantageously lead to the occurrence of cavitation.

A technique for improving the accuracy of measurement with reference to the dependence on the reigning flow profile is a partial reduction of the cross sectional area of the measuring tube in the region of the measuring section. A reduction of the cross sectional area offers the advantage that the flow velocity of the fluid in this region is higher. In this way, the reigning flow profile is conditioned, which leads over a large range of flow velocity to an improving of the measuring performance, or measuring sensitivity. Then, in turn, the inlet section and outflow section of the measuring tube can be shorter, which can be advantageous especially as regards costs associated with material.

Construction of a measuring tube with partially reduced cross sectional area is disclosed, for example, in European patent, EP2600119A1. There, a magneto-inductive flow measuring device is described, wherein cross sectional area of the measuring section is both less than the cross sectional area of the inflow section as well as also less than the cross sectional area of the outflow section following the measuring section. Moreover, selected for the measuring section is especially a rectangular measuring tube profile. Regarding the manufacture of such a measuring tube, it is mentioned that the cross-sectional reduction is achieved by forces acting externally on the measuring tube. However, how in detail the cross-sectional reduction is accomplished and how the forces can be controlled, in such a manner that they will lead to a certain shape of the measuring tube, is not disclosed. Furthermore, it is not explained how to assure that a liner arranged in the interior of the measuring tube is not damaged by the cross-section reduction.

Another method for reducing the cross sectional area of the measuring section involves the application an internal high-pressure forming, the so-called hydroforming method, and is treated in German patent, DE102008057755A1. However, there is also in the case of this method the problem regarding the liner, which can only be installed following the forming of the measuring tube. This is, however, significantly more complicated than the installation of a liner into a measuring tube still having a uniform cross sectional area.

SUMMARY OF THE INVENTION

An object of the present invention is to provide a method for manufacturing an apparatus for measuring flow using the magneto-inductive measuring principle, wherein the cross sectional area of the measuring section can be easily and reliably reduced.

This object is achieved according to the invention by a method for manufacturing an apparatus for measuring flow of a fluid flowing through a measuring tube of metal using the magneto-inductive principle, comprising the method steps as follows:

securing first and second collars of metal externally on the measuring tube with an orientation perpendicular to the tube axis of the measuring tube, lining the measuring tube internally with an electrically non-conductive, elastic liner, altering a measuring section of the measuring tube located at least partially between the first and second collars by means of cold deformation in such a manner that the cross sectional area of the measuring section is reduced compared with the cross sectional area of an inflow section of the measuring tube located upstream from the measuring section and an outflow section of the measuring tube located downstream from the measuring section.

Using cold deformation, the cross sectional area of the measuring tube in the region of the measuring section can be reduced with a targeted outcome. Since the temperatures during a cold deformation remain below the recrystallization temperature of the respective material, this method is protective in comparison to the methods described in the introduction. There is, for example, typically no scaling of individual regions. Furthermore, the method permits close dimensional tolerances in the forming, in the case of which, moreover, the strength, or ductility, of the material is increased.

Advantageously, the method can be implemented with small capital costs and in a simple manner. The affixing of the first and second collars has an additional stabilizing effect for the forming process. A further advantage of the method of the invention relates to the liner. This can be installed in the measuring tube before the forming. This facilitates the manufacturing process extraordinarily, for an exactly fitting installation of a liner in a measuring tube of varying cross-section is clearly complex.

In an advantageous embodiment, the first collar is located in the region of the transition between the inflow section and the measuring section and the second collar in the region of the transition between the measuring section and the outflow section.

Alternatively, the first collar is located in the region of the inflow section and the second collar in the region of the outflow section. Moreover, an embodiment provides that the first and second collars are located in the region of the measuring section.

The exact embodiment and arrangement of the first and second collars on the measuring tube can be matched to the particular application. If because of space reasons an especially compact construction is desired, an application of the first and second collars in the region of the measuring section is best. Otherwise, as a rule, the nominal diameter of the measuring tube is decisive for positioning the first and second collars. Besides the arrangements mentioned here, of course there are other options for the exact positioning, which likewise fall within the scope of the invention.

It is advantageous that a housing for the flow measuring device is secured on the first and second collars. This technique means that no other structures are required on the measuring tube or component, in order to secure the housing to the flow measuring device. The first and second collars have, thus, a double functionality—providing a stabilizing effect during the forming as well as serving as a securement component for a housing.

It is, moreover, advantageous, when a measuring tube with circular or rectangular cross section is used.

In a preferred embodiment, the measuring section has after the cold deformation an altered cross-sectional area geometry, especially a rectangular profile. Thus, not only the cross sectional area is reduced but also the geometry of the cross sectional area is altered.

In an especially preferred embodiment, the cold deformation is performed by means of at least two rams, which are pressed externally of the measuring tube between the first and second collars from two oppositely lying sides of the measuring tube. The collars support on the ram during the forming and correspondingly provide a stabilizing effect.

It is furthermore advantageous when on at least two oppositely lying sides of the measuring tube, in each case, at least one welded stud is externally secured and that the welded studs are positioned centrally along a connecting line extending through the first and second collars and parallel to the tube axis. In such case, it is especially advantageous, when the magnet system is secured on the at least two welded studs. It is likewise advantageous when the welded studs are secured to the measuring tube before the cold deformation, and when for the cold deformation at least two rams are used, which have cavities for the welded studs.

In an additional embodiment, after the cold deformation, at least two measuring electrodes are secured in the or to the measuring tube.

In an especially preferred embodiment, a liner with a hardness of less than Shore 90A is used. By application of such a liner, it can be assured that the liner is not damaged during the cold deformation, since it has sufficient elasticity.

It is, in such case, advantageous, when a liner of polyurethane, soft rubber, hard rubber or PTFE is used.

In a preferred embodiment, the first and second collars are welded and the welded studs are secured to the measuring tube by spot welding.

In an additional preferred embodiment, the cross sectional area of the measuring section is reduced compared with the cross sectional area of the inflow section and the outflow section by a factor of 1.1 to 1.5.

BRIEF DESCRIPTION OF THE DRAWINGS

The invention as well as advantageous embodiments thereof will now be described based on the figures of the drawing. The figures of the drawing show as follows.

DETAILED DISCUSSION IN CONJUNCTION WITH THE DRAWINGS

Figure 1:
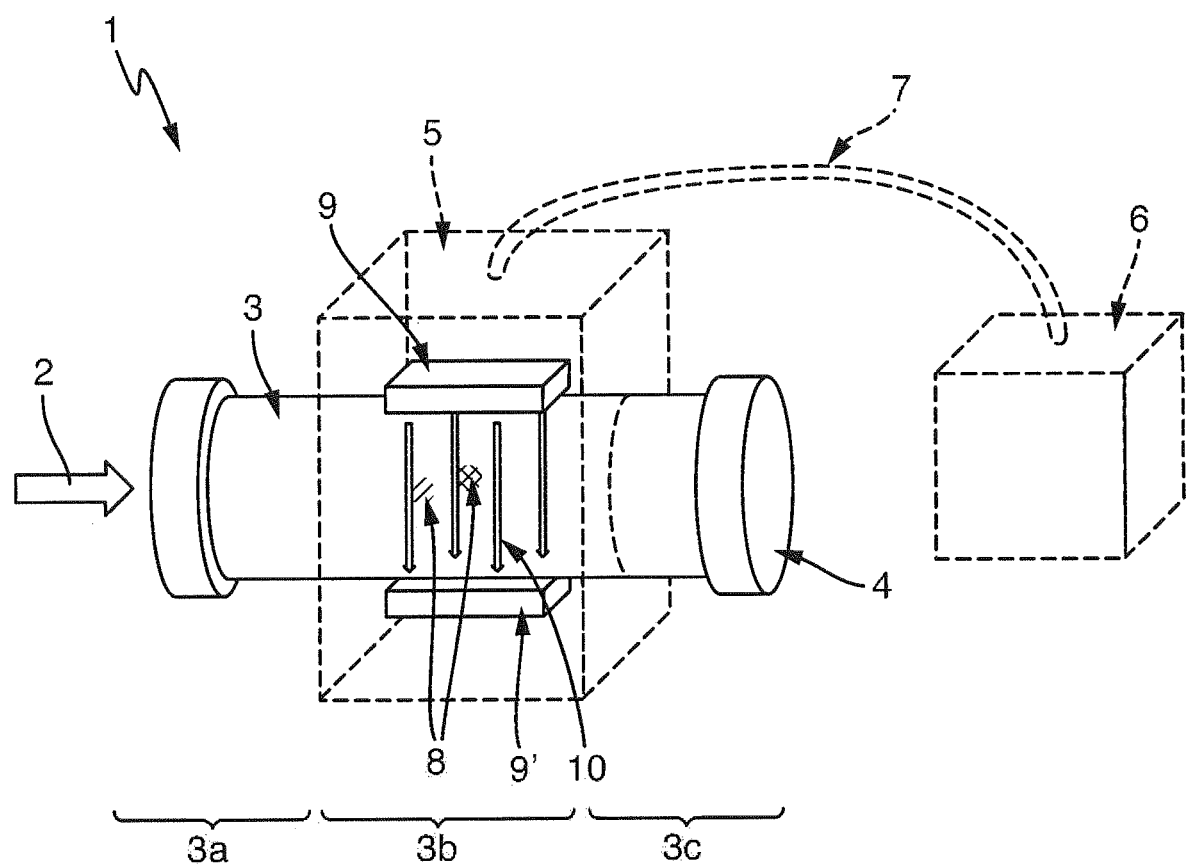
FIG. 1 is a magneto-inductive flow measuring device according to the state of the art.

FIG. 1 shows a magneto-inductive flow measuring device 1 for measuring flow of a fluid 2 flowing through a measuring tube 3. Measuring tube 3 is provide in the region facing the fluid, i.e. on the inside over the entire length, with an electrically insulating liner 4. Measuring tube 3 is conveniently subdivided into an inlet section 3a, a measuring section 3b, on which the sensor unit is placed, and an outflow section 3c. Shown for the sensor unit are a measuring electrode pair 8 for sensing the induced voltage and the magnet system 9,9', which is represented in FIG. 1 by two boxes. Magnet system 9,9' comprises at least two coils 9,9' for producing the magnetic field 10 and, in given cases, also pole shoes and/or field-guiding sheet metal pieces for implementing an advantageous spatial distribution of the magnetic field. The connecting axes of the measuring electrode pair 8 and the field coils 9,9 extend mutually perpendicularly to one another, wherein the two field coils and the two measuring electrodes 8 are positioned respectively on oppositely lying sides of the measuring tube 3.

The sensor unit with its respective components such as e.g. the measuring electrode pair 8 and the magnet system 9,9' is usually surrounded at least partially by a housing 5. Provided in the housing 5 or in the present case outside of the housing 5 is furthermore an electronics unit 6, which is connected electrically via a connecting cable 7 with the field device 1. The electronics unit serves for signal registration and/or—evaluation or for power supply of the coils, as well as interface to the outside, e.g. for measured value output or adjustment of the device.

Figure 2:
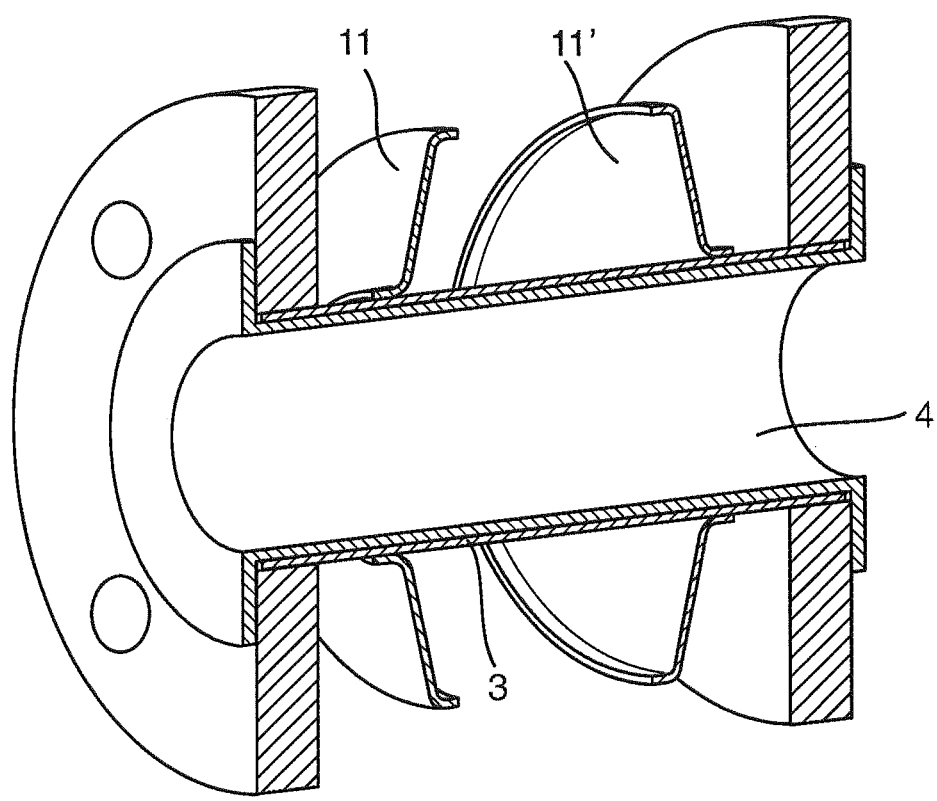
FIG. 2 is a measuring tube lined with a liner and having first and second collars secured thereon.

First steps of the method of the invention for reducing the cross section of the measuring tube in the measuring section are shown in FIG. 2. First, a first collar 11 and a second collar 11' are secured externally on the measuring tube 3. Then, the measuring tube 3 is lined internally with an electrically non-conductive liner 4. In this example, the measuring tube 3 has a circularly round cross sectional area.

Figure 3:
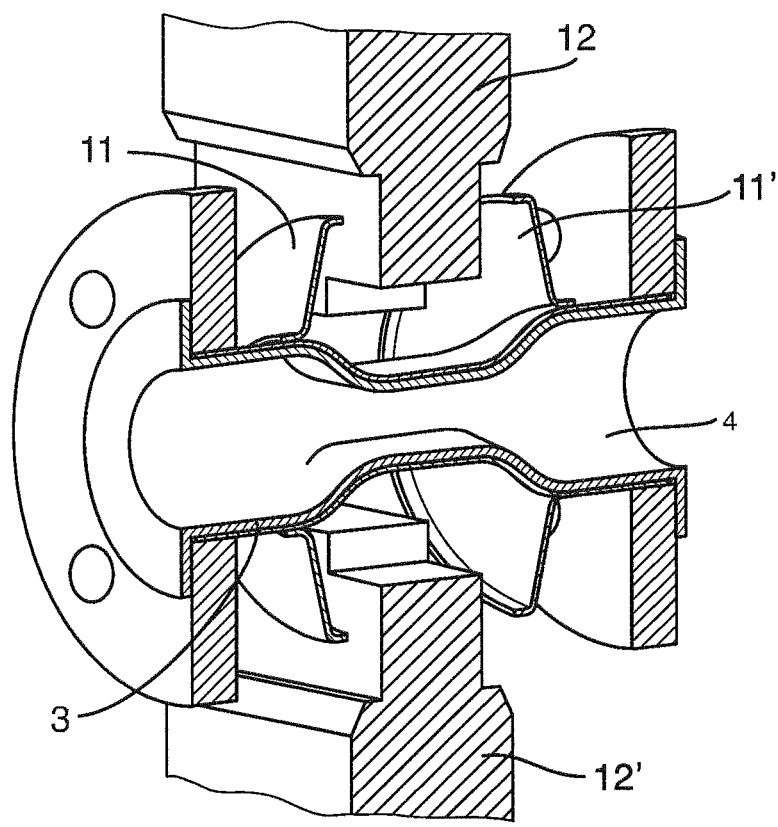
FIG. 3 is an illustration of cold deformation by means of two rams acting on a measuring tube of FIG. 2.

The performing of a cold deformation of the invention is illustrated in FIG. 3. The cold deformation is performed by means of two rams 12, 12', which are pressed against the measuring tube in the region between the first collar 11 and the second collar 11' from two oppositely lying sides of the measuring tube 3. The first and second collars 11,11' effect a stabilizing of the measuring tube 3 during this procedure. In this example, no welded studs are provided. It is understood, however, that the rams 12,12' in another example of an embodiment can also have cavities for previously mounted, welded studs.

After the forming, the respectively required components of the sensor unit of the flow measuring device can be mounted. First, for example, the at least two measuring electrodes 8,8' can be secured and then the magnet system 9,9'.

Figure 4:
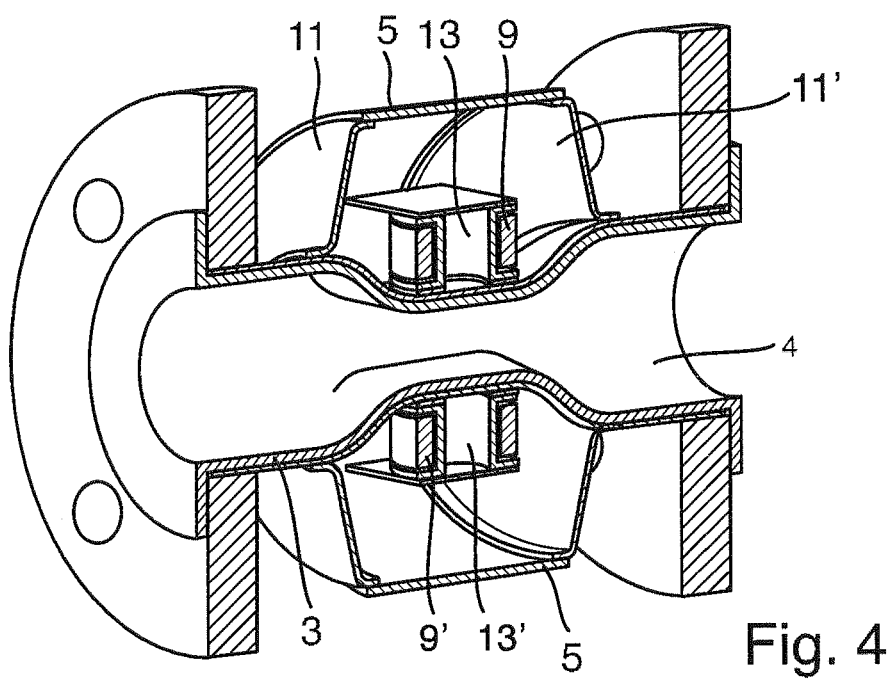
FIG. 4 is a cold formed measuring tube with mounted magnet system.

FIG. 4 shows, finally, a cold formed measuring tube 3' with mounted magnet system 9,9' placed on two welded studs 13,13'. Also shown is a housing 5 welded on the first and second collars 11,11'. The arrangement of a housing 5 directly on the first and second collars 11,11' is especially easy to accomplish and requires no additional structural means. As a result, the first and second collars serve a double function: stabilizing the measuring tube 3 during the cold deformation and supporting the housing 5.

The invention claimed is:

1. The method for manufacturing an apparatus for measuring flow of a fluid flowing through a measuring tube of metal using the magneto-inductive principle, comprising the steps as follows:
   securing first and second collars of metal externally on the measuring tube with an orientation perpendicular to the tube axis of the measuring tube;
   lining the measuring tube internally with an electrically non-conductive, elastic liner; and
   altering a measuring section of the measuring tube located at least partially between the first collar and the second collar by means of cold deformation in such a manner that the cross sectional area of the measuring section is reduced compared with the cross sectional area of an inflow section of the measuring tube located upstream from the measuring section and an outflow section of the measuring tube located downstream from the measuring section.

2. The method as claimed in claim 1, wherein:
   the first collar is located in the region of a transition between the inflow section and the measuring section; and
   the second collar is located in the region of a transition between the measuring section and the outflow section.

3. The method as claimed in claim 1, wherein:
   the first collar is located in the region of the inflow section; and
   the second collar is located in the region of the outflow section.

4. The method as claimed in claim 1, wherein:
   the first collar and the second collar are located in the region of the measuring section.

5. The method as claimed in claim 1, wherein:
   a housing is secured on the first collar and on the second collar.

6. The method as claimed in claim 1, wherein:
   a measuring tube with circular or rectangular cross section is used.

7. The method as claimed in claim 1, wherein:
   the measuring section has after the cold deformation an altered cross-sectional area geometry.

8. The method as claimed in claim 1, wherein:
   said cold deformation is performed by means of at least two rams, which are pressed externally of the measuring tube between the first collar and the second collar from two oppositely-lying sides of the measuring tube.

9. The method as claimed in claim 1, wherein:
   on at least two oppositely-lying sides of the measuring tube, in each case, at least one welded stud is externally secured, and the welded studs are positioned centrally along a connecting line extending through the first collar and the second collar and parallel to the tube axis.

10. The method as claimed in claim 9, wherein:
    a magnet system is secured on the welded studs.

11. The method as claimed in claim 9, wherein:
    the welded studs are secured to the measuring tube before said cold deformation; and
    for said cold deformation at least two rams are used, which have cavities for the welded studs.

12. The method as claimed in claim 1, wherein:
    after said cold deformation, at least two measuring electrodes are secured in the or to the measuring tube.

13. The method as claimed in claim 1, wherein:
    a liner with a hardness of less than Shore 90A is used.

14. The method as claimed in claim 13, wherein:
    a liner of polyurethane, soft rubber, hard rubber or PTFE is used.

15. The method as claimed in claim 1, wherein:
    the first collar and the second collar are welded and welded studs are secured to the measuring tube by spot welding.

16. The method as claimed in claim 1, wherein:
    cross sectional area of the measuring section is reduced compared with the cross sectional area of the inflow section and the outflow section by factor of 1.1 to 1.5.

17. The method as claimed in claim 1, wherein:
    the measuring section has after the cold deformation a rectangular profile.

* * * * *